(12) United States Patent
Peterson (10) Patent No.: US 8,487,912 B1
(45) Date of Patent: Jul. 16, 2013

(54) CAPACITIVE SENSE TOUCH DEVICE WITH HYSTERESIS THRESHOLD

(75) Inventor: Jonathan Peterson, Everett, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1127 days.

(21) Appl. No.: 12/060,203

(22) Filed: Mar. 31, 2008

Related U.S. Application Data (60) Provisional application No. 61/025,699, filed on Feb. 1, 2008.

(51) Int. Cl.
G06F 3/042 (2006.01)
(52) U.S. Cl.
USPC .......................................... 345/175; 345/174
(58) Field of Classification Search
USPC ................................ 345/173–175; 178/18.06
See application file for complete search history.

(56) References Cited

U.S. PATENT DOCUMENTS

| | | | |
|---|---|---|---|
| 4,264,903 A | 4/1981 | Bigelow |
| 4,283,713 A | 8/1981 | Philipp |
| 4,438,404 A | 3/1984 | Philipp |
| 4,475,151 A | 10/1984 | Philipp |
| 4,497,575 A | 2/1985 | Philipp |
| 4,736,097 A | 4/1988 | Philipp |
| 4,736,191 A | 4/1988 | Matzke et al. |
| 4,773,024 A | 9/1988 | Faggin et al. |
| 4,802,103 A | 1/1989 | Faggin et al. |
| 4,876,534 A | 10/1989 | Mead et al. |
| 4,879,461 A | 11/1989 | Philipp |
| 4,935,702 A | 6/1990 | Mead et al. |
| 4,953,928 A | 9/1990 | Anderson et al. |
| 4,962,342 A | 10/1990 | Mead et al. |
| 5,049,758 A | 9/1991 | Mead et al. |
| 5,055,827 A | 10/1991 | Philipp |
| 5,059,920 A | 10/1991 | Anderson et al. |
| 5,068,622 A | 11/1991 | Mead et al. |
| 5,073,759 A | 12/1991 | Mead et al. |
| 5,083,044 A | 1/1992 | Mead et al. |
| 5,095,284 A | 3/1992 | Mead |
| 5,097,305 A | 3/1992 | Mead et al. |
| 5,107,149 A | 4/1992 | Platt et al. |
| 5,109,261 A | 4/1992 | Mead et al. |
| 5,119,038 A | 6/1992 | Anderson et al. |
| 5,120,996 A | 6/1992 | Mead et al. |
| 5,122,800 A | 6/1992 | Philipp |
| 5,126,685 A | 6/1992 | Platt et al. |
| 5,146,106 A | 9/1992 | Anderson et al. |
| 5,160,899 A | 11/1992 | Anderson et al. |
| 5,165,054 A | 11/1992 | Platt et al. |
| 5,166,562 A | 11/1992 | Allen et al. |

(Continued)

OTHER PUBLICATIONS

U.S. Appl. No. 11/489,944, "Uninterrupted Radial Capacitive Sense Interface", filed Jul. 19, 2006; 49 pages.

(Continued)

Primary Examiner — Quan-Zhen Wang
Assistant Examiner — Yuk Chow (57) ABSTRACT

In one embodiment, control circuitry receives an indication of a current position of an input object on a capacitive touch sense device. The control circuitry determines whether a difference between a previous position and the current position exceeds a predetermined hysteresis threshold. If the determined difference does not exceed the predetermined hysteresis threshold, the control circuitry masks the current position of the input object on the capacitive touch sense device.

20 Claims, 9 Drawing Sheets

U.S. PATENT DOCUMENTS

| | | |
|---|---|---|
| 5,204,549 A | 4/1993 | Platt et al. |
| 5,243,554 A | 9/1993 | Allen et al. |
| 5,248,873 A | 9/1993 | Allen et al. |
| 5,260,592 A | 11/1993 | Mead et al. |
| 5,270,963 A | 12/1993 | Allen et al. |
| 5,276,407 A | 1/1994 | Mead et al. |
| 5,289,023 A | 2/1994 | Mead |
| 5,303,329 A | 4/1994 | Mead et al. |
| 5,305,017 A | 4/1994 | Gerpheide |
| 5,324,958 A | 6/1994 | Mead et al. |
| 5,331,215 A | 7/1994 | Allen et al. |
| 5,336,936 A | 8/1994 | Allen et al. |
| 5,339,213 A | 8/1994 | O'Callaghan |
| 5,349,303 A | 9/1994 | Gerpheide |
| 5,374,787 A | 12/1994 | Miller et al. |
| 5,381,515 A | 1/1995 | Platt et al. |
| 5,384,467 A | 1/1995 | Plimon et al. |
| 5,408,194 A | 4/1995 | Steinbach et al. |
| 5,488,204 A | 1/1996 | Mead et al. |
| 5,495,077 A | 2/1996 | Miller et al. |
| 5,541,878 A | 7/1996 | Lemoncheck et al. |
| 5,543,588 A | 8/1996 | Bisset et al. |
| 5,543,590 A | 8/1996 | Gillespie et al. |
| 5,543,591 A | 8/1996 | Gillespie et al. |
| 5,555,907 A | 9/1996 | Philipp |
| 5,565,658 A | 10/1996 | Gerpheide et al. |
| 5,566,702 A | 10/1996 | Philipp |
| 5,629,891 A | 5/1997 | Lemoncheck et al. |
| 5,648,642 A | 7/1997 | Miller et al. |
| 5,682,032 A | 10/1997 | Philipp |
| 5,730,165 A | 3/1998 | Philipp |
| 5,757,368 A | 5/1998 | Gerpheide et al. |
| 5,763,909 A | 6/1998 | Mead et al. |
| 5,767,457 A | 6/1998 | Gerpheide et al. |
| 5,796,183 A | 8/1998 | Hourmand et al. |
| 5,812,698 A | 9/1998 | Platt et al. |
| 5,841,078 A | 11/1998 | Miller et al. |
| 5,844,265 A | 12/1998 | Mead et al. |
| 5,854,625 A | 12/1998 | Frisch et al. |
| 5,861,583 A | 1/1999 | Schediwy et al. |
| 5,861,875 A | 1/1999 | Gerpheide |
| 5,864,242 A | 1/1999 | Allen et al. |
| 5,864,392 A | 1/1999 | Winklhofer et al. |
| 5,880,411 A | 3/1999 | Gillespie et al. |
| 5,889,236 A | 3/1999 | Gillespie et al. |
| 5,914,465 A | 6/1999 | Allen et al. |
| 5,914,708 A | 6/1999 | Lagrange et al. |
| 5,920,310 A | 7/1999 | Faggin et al. |
| 5,926,566 A | 7/1999 | Wang et al. |
| 5,942,733 A | 8/1999 | Allen et al. |
| 5,943,052 A | 8/1999 | Allen et al. |
| 5,969,513 A | 10/1999 | Clark |
| 6,023,422 A | 2/2000 | Allen et al. |
| 6,028,271 A | 2/2000 | Gillespie et al. |
| 6,028,959 A | 2/2000 | Wang et al. |
| 6,097,432 A | 8/2000 | Mead et al. |
| 6,148,104 A | 11/2000 | Wang et al. |
| 6,185,450 B1 | 2/2001 | Seguine et al. |
| 6,188,228 B1 | 2/2001 | Philipp |
| 6,188,391 B1 | 2/2001 | Seely et al. |
| 6,222,528 B1 | 4/2001 | Gerpheide et al. |
| 6,239,389 B1 | 5/2001 | Allen et al. |
| 6,249,447 B1 | 6/2001 | Boylan et al. |
| 6,262,717 B1 | 7/2001 | Donohue et al. |
| 6,280,391 B1 | 8/2001 | Olson et al. |
| 6,288,707 B1 | 9/2001 | Philipp |
| 6,304,014 B1 | 10/2001 | England et al. |
| 6,320,184 B1 | 11/2001 | Winklhofer et al. |
| 6,323,846 B1 | 11/2001 | Westerman et al. |
| 6,326,859 B1 | 12/2001 | Goldman et al. |
| 6,377,009 B1 | 4/2002 | Philipp |
| 6,380,929 B1 | 4/2002 | Platt |
| 6,380,931 B1 | 4/2002 | Gillespie et al. |
| 6,414,671 B1 | 7/2002 | Gillespie et al. |
| 6,430,305 B1 | 8/2002 | Decker |
| 6,441,073 B1 | 8/2002 | Tanaka et al. |
| 6,452,514 B1 | 9/2002 | Philipp |
| 6,457,355 B1 | 10/2002 | Philipp |
| 6,466,036 B1 | 10/2002 | Philipp |
| 6,473,069 B1 | 10/2002 | Gerpheide |
| 6,489,899 B1 | 12/2002 | Ely et al. |
| 6,498,720 B2 | 12/2002 | Glad |
| 6,499,359 B1 | 12/2002 | Washeleski et al. |
| 6,522,128 B1 | 2/2003 | Ely et al. |
| 6,523,416 B2 | 2/2003 | Takagi et al. |
| 6,534,970 B1 | 3/2003 | Ely et al. |
| 6,535,200 B2 | 3/2003 | Philipp |
| 6,570,557 B1 | 5/2003 | Westerman et al. |
| 6,587,093 B1 | 7/2003 | Shaw et al. |
| 6,610,936 B2 | 8/2003 | Gillespie et al. |
| 6,624,640 B2 | 9/2003 | Lund et al. |
| 6,639,586 B2 | 10/2003 | Gerpheide |
| 6,642,857 B1 | 11/2003 | Schediwy et al. |
| 6,649,924 B1 | 11/2003 | Philipp et al. |
| 6,667,740 B2 | 12/2003 | Ely et al. |
| 6,673,308 B2 | 1/2004 | Hino et al. |
| 6,677,932 B1 | 1/2004 | Westerman |
| 6,680,731 B2 | 1/2004 | Gerpheide et al. |
| 6,683,462 B2 | 1/2004 | Shimizu |
| 6,705,511 B1 | 3/2004 | Dames et al. |
| 6,714,817 B2 | 3/2004 | Daynes et al. |
| 6,730,863 B1 | 5/2004 | Gerpheide et al. |
| 6,750,852 B2 | 6/2004 | Gillespie et al. |
| 6,788,221 B1 | 9/2004 | Ely et al. |
| 6,798,218 B2 | 9/2004 | Kasperkovitz |
| 6,809,275 B1 | 10/2004 | Cheng et al. |
| 6,856,433 B2 | 2/2005 | Hatano et al. |
| 6,873,203 B1 | 3/2005 | Latham, II et al. |
| 6,888,538 B2 | 5/2005 | Ely et al. |
| 6,893,724 B2 | 5/2005 | Lin et al. |
| 6,969,978 B2 | 11/2005 | Dening |
| 6,975,123 B1 | 12/2005 | Malang et al. |
| 7,046,230 B2 | 5/2006 | Zadesky et al. |
| 7,119,550 B2 | 10/2006 | Kitano et al. |
| 2002/0063688 A1 | 5/2002 | Shaw et al. |
| 2002/0191029 A1 | 12/2002 | Gillespie et al. |
| 2003/0025679 A1 | 2/2003 | Taylor et al. |
| 2003/0062889 A1 | 4/2003 | Ely et al. |
| 2003/0063428 A1 | 4/2003 | Nishi |
| 2003/0080755 A1 | 5/2003 | Kobayashi |
| 2003/0156098 A1 | 8/2003 | Shaw et al. |
| 2003/0160808 A1 | 8/2003 | Foote et al. |
| 2003/0183864 A1 | 10/2003 | Miyazawa |
| 2003/0183884 A1 | 10/2003 | Miyazawa |
| 2003/0184315 A1 | 10/2003 | Eberlein |
| 2004/0169594 A1 | 9/2004 | Ely et al. |
| 2004/0178989 A1 | 9/2004 | Shahoian et al. |
| 2004/0178997 A1 | 9/2004 | Gillespie et al. |
| 2004/0252109 A1* | 12/2004 | Trent et al. ............ 345/174 |
| 2004/0263864 A1 | 12/2004 | Lukacs et al. |
| 2005/0021269 A1 | 1/2005 | Ely et al. |
| 2005/0024341 A1 | 2/2005 | Gillespie et al. |
| 2005/0052425 A1* | 3/2005 | Zadesky et al. ............ 345/173 |
| 2005/0073302 A1 | 4/2005 | Hibbs et al. |
| 2005/0073322 A1 | 4/2005 | Hibbs et al. |
| 2005/0083110 A1 | 4/2005 | Latham, II et al. |
| 2006/0032680 A1* | 2/2006 | Elias et al. ............ 178/18.06 |
| 2006/0097991 A1 | 5/2006 | Hotelling et al. |
| 2006/0113974 A1 | 6/2006 | Kan et al. |
| 2006/0164142 A1 | 7/2006 | Stanley |
| 2006/0273804 A1 | 12/2006 | Delorme et al. |
| 2007/0236450 A1* | 10/2007 | Colgate et al. ............ 345/156 |
| 2007/0291016 A1* | 12/2007 | Philipp ............ 345/174 |
| 2008/0024455 A1* | 1/2008 | Lee et al. ............ 345/173 |
| 2008/0168478 A1* | 7/2008 | Platzer et al. ............ 719/328 |
| 2009/0109173 A1* | 4/2009 | Fu ............ 345/156 |

OTHER PUBLICATIONS

USPTO Notice of Allowance for U.S. Appl. No. 11/489,944 dated Apr. 9, 2007; 7 pages.

USPTO Notice of Allowance for U.S. Appl. No. 11/489,944 dated May 24, 2007; 2 pages.

Chapweske, Adam; "The PS/2 Mouse Interface," PS/2 Mouse Interfacing, 2001, retrieved on May 18, 2006; 11 pages.

Cypress Semiconductor Corporation, "CY8C21x34 Data Sheet," CSR User Module, CSR V.1.0; Oct. 6, 2005; 36 pages.

Cypress Semiconductor Corporation, "Cypress Introduces PSoC(TM)-Based Capacitive Touch Sensor Solution," Cypress Press Release; May 31, 2005; <http://www.cypress.com/portal/server>; retrieved on Feb. 5, 2007; 4 pages.

Cypress Semiconductor Corporation, "FAN Controller CG6457AM and CG6462AM," PSoC Mixed Signal Array Preliminary Data Sheet; May 24, 2005; 25 pages.

Cypress Semiconductor Corporation, "PSoC CY8C20x34 Technical Reference Manual (TRM)," PSoC CY8C20x34 TRM, Version 1.0, 2006; 218 pages.

Cypress Semiconductor Corporation, "PSoC Mixed-Signal Controllers," Production Description; <http://www.cypress.com/portal/server>; retrieved on Sep. 27, 2005; 2 pages.

Cypress Semiconductor Corporation, "Release Notes srn017," Jan. 24, 2007; 3 pages.

Lee, Mark; "EMC Design Considerations for PSoC CapSense Applications," Cypress Semiconductor Corporation, Application Note AN2318; Sep. 16, 2005; 6 pages.

Sedra, Adel S. et al., "Microelectronic Circuits," 3rd Edition, Oxford University Press, pp. xiii-xx and 861-883, 1991; 20 pages.

Seguine, Ryan; "Layout Guidelines for PSoC CapSense," Cypress Semiconductor Corporation, Application Note AN2292; Jul. 22, 2005; 13 pages.

Van Ess, David; "Simulating a 555 Timer with PSoC," Cypress Semiconductor Corporation, Application Note AN2286, May 19, 2005; 10 pages.

* cited by examiner

CAPACITIVE SENSE TOUCH DEVICE WITH HYSTERESIS THRESHOLD

CROSS REFERENCE TO RELATED APPLICATIONS

This application claims priority from U.S. provisional application No. 61/025,699, filed Feb. 1, 2008, which is incorporated by reference in its entirety for all purposes.

TECHNICAL FIELD

The present disclosure relates generally to user interfaces utilizing capacitive touch sensing.

BACKGROUND

Touch screens, touch pads, series of touch buttons, and other capacitive touch sense devices determine the presence of a finger or other object relative to the device according to capacitive changes caused by the finger or object. Some capacitive touch sense devices are integrated with mechanical buttons in addition to the capacitive touch sense input. The FIG. 1A shows an example of a radial slider having integrated mechanical buttons.

Figure 1A:
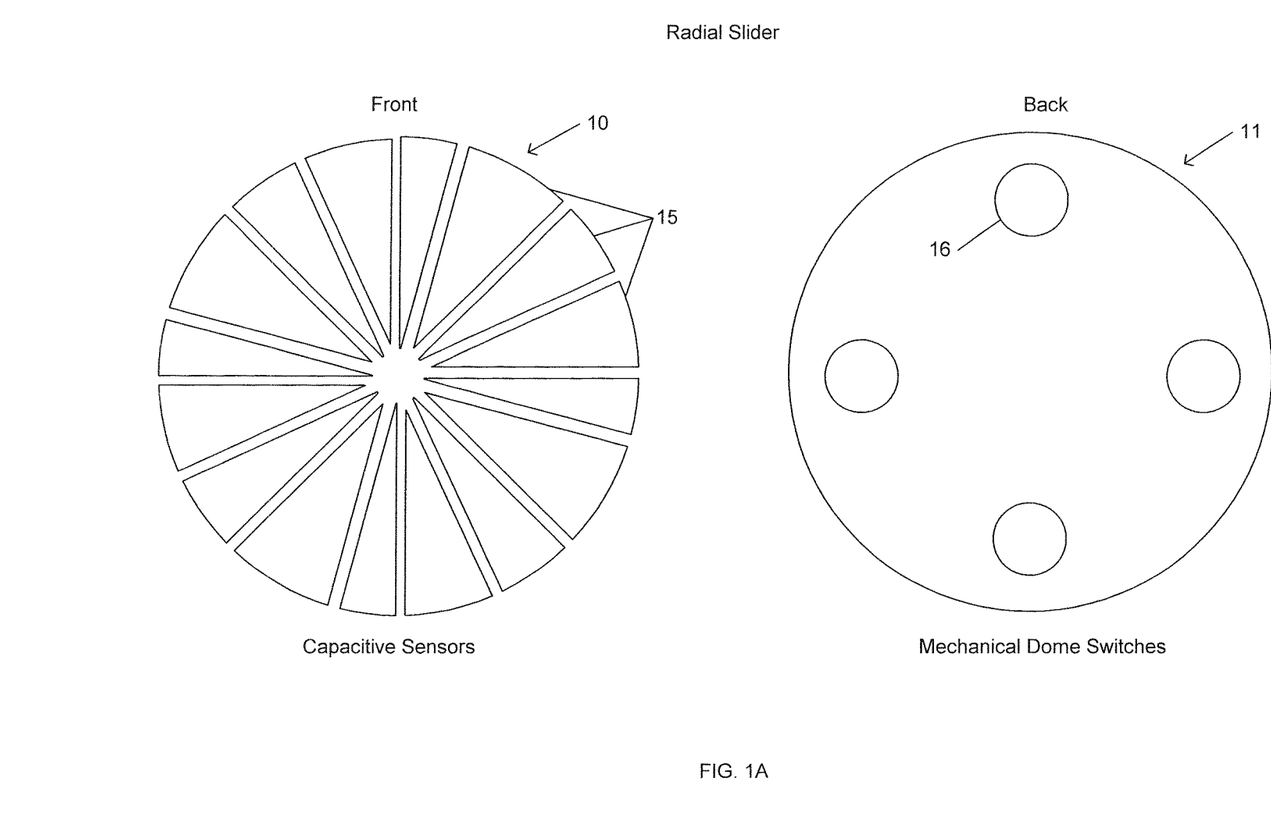
FIG. 1A shows an example of a radial slider.

Referring to FIG. 1A, the front surface 10 includes structures 15 associated with a capacitor array. As a finger slides over these structures 15 capacitive changes can be detected to track the movement and position of the finger relative to the structures 15. The back surface 11 includes dome switches 16. If the finger presses against the front surface 10 using a force exceeding a threshold, one of the dome switches 16 contacts a gimble plate thereby generating a corresponding signal.

Figure 1B:
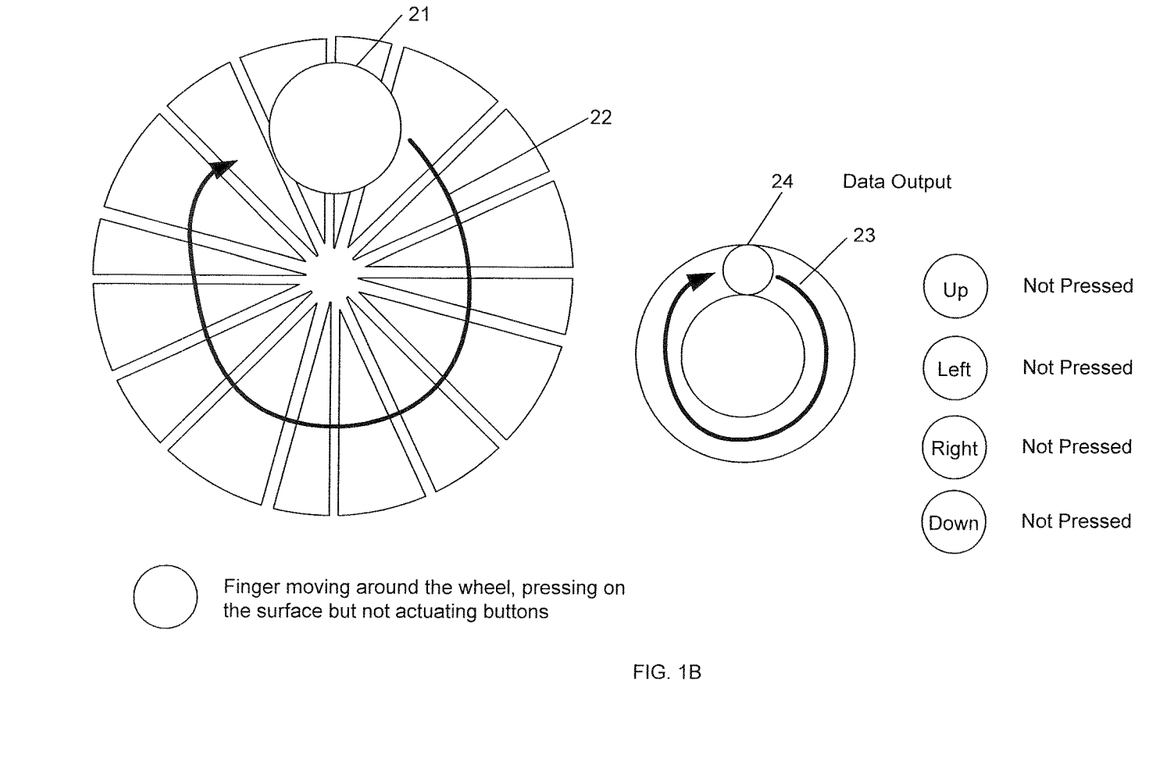
FIGS. 1B-C illustrate operation of the example radial slider shown in FIG. 1A.

Referring now to FIG. 1B, when a finger lightly touches position 21, and then thereafter slides along the path 22, a data output is registered. The data output matches the user's intended input by correctly identifying the path 23 extending from the originating position 24. The data output also correctly reports that no button presses took place.

Figure 1C:
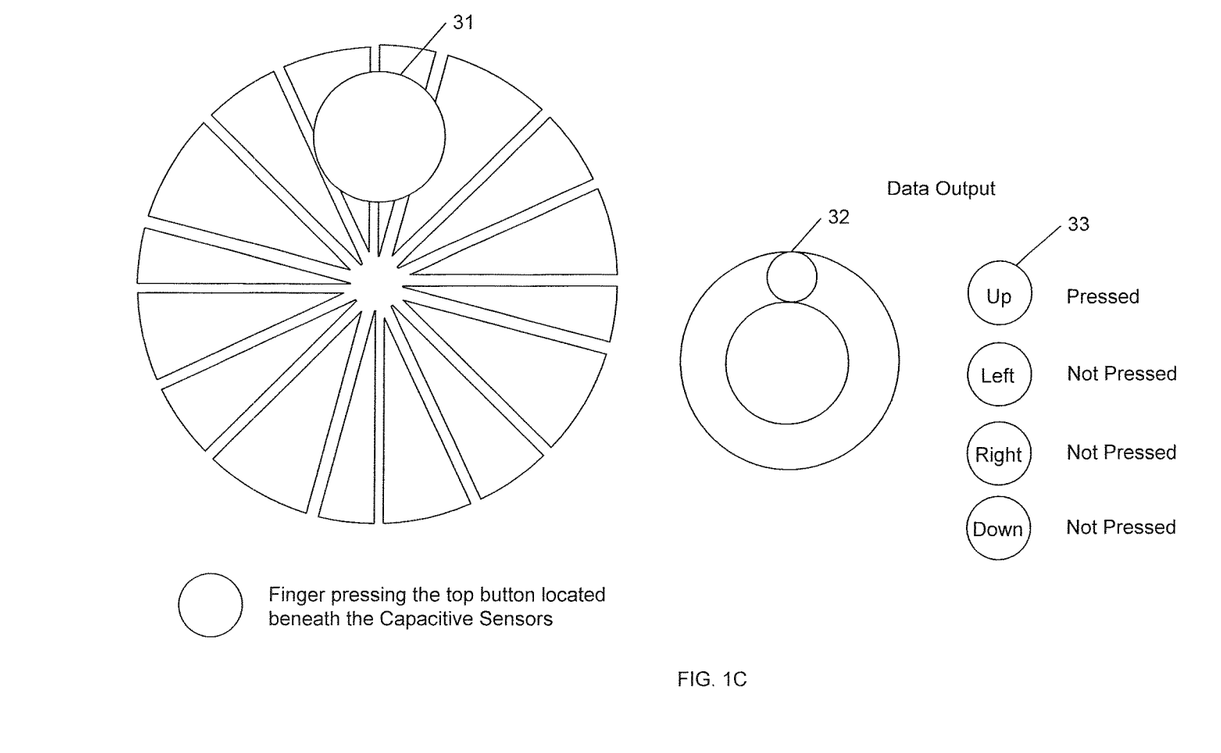

Referring now to FIG. 1C, when a finger strongly presses against the position 31, a data output is registered. The data output indicates a press 33 on the upper dome, which matches the user's intended input (the button press at position 31). However, the data output also registers a touch 32, and possibly some small movement (not shown), via capacitive sensing. The user may have intended to only manipulate the upper dome switch; however, the presence of the finger near the corresponding capacitors causes the touch 32 to be registered whenever the press 33 is registered.

The data output identifying both the touch position 32 and the button press 33 is reported to a software application, and because the user did not intend the touch input, the software program receives partially invalid data. The disclosure that follows solves this and other problems.

SUMMARY OF THE INVENTION

In one embodiment, a system includes a radial slider coupled to capacitive touch sense circuitry that is configured to output an indication of a position of an input object relative to a surface of the radial slider. Below the surface of the radial slider, the system can include at least one button configured to change positions according to whether the input object is pressed against the surface of the radial slider using a force that exceeds a force threshold. Control circuitry receives, from the capacitive touch sense circuitry, a signal indicating a current radial position of the input object on the surface of the radial slider. The control circuitry determines a difference between the current radial position and a previous radial position. The control circuitry then compares the determined difference to a hysteresis value. The control circuitry then masks the current radial position from an output according to the comparison, which prevents a software program from receiving a partially erroneous input.

When the system receives an indication that the input object pressed against the surface of the radial slider using a force that exceeds a force threshold, the system outputs the press indication independently of whether the current radial position is masked.

The hysteresis value can be programmable. The radial slider can be mapped to any number of positions, such as three hundred and sixty positions.

Another embodiment includes an apparatus with control circuitry configured to be connected to capacitive touch sense devices having radial sliders. The control circuitry is operable to receive an indication of a current radial position of an input object on a radial slider of a capacitive touch sense device, to determine a difference between the current radial position and a previous radial position, to compare the determined difference to a threshold value, and to output the current radial position according to the comparison.

The control circuitry can also be operable to output indications of input object presses without filtering, whereas the control circuitry filters indications of input object touches according to the comparison.

The control circuitry can also be operable to identify a first threshold position and a second threshold position, the threshold positions corresponding to the previous radial position, and then compare the threshold positions to determine if said positions are adjacent to a predefined wrap-around position on the radial slider. The comparison can include determining whether the first threshold position is greater than the second threshold. If the threshold positions are not adjacent to the predefined wrap-around position, the control circuitry is operable to mask the current radial position if the current radial position is between the threshold positions. If the threshold positions are adjacent to the predefined wrap-around position, the control circuitry is operable to mask the current radial position if the current radial position is not between the threshold positions.

The control circuitry can be operable to determine whether the previous radial position is less than the threshold value. If the previous radial position is not less than the threshold value, the control circuitry is operable to determine a first threshold position by subtracting the threshold value from the previous radial position. If the previous radial position is less than the threshold value, the control circuitry is operable to determine the first threshold position by first subtracting the previous radial position from the threshold value, and then subtracting the difference from the number of radial positions mapped to the radial slider.

The control circuitry can be operable to determine whether the sum of the previous radial position and the number of radial positions mapped to the radial slider is greater than the threshold value. If the sum is not greater than the threshold value, the control circuitry is operable to determine the second threshold position by adding the threshold value to the previous radial position. If the sum is greater than the threshold value, the control circuitry is operable to determine the second threshold position by subtracting the number of radial positions from the sum of the previous radial position and the threshold value.

The control circuitry can be operable to calculate a rate that the input object has moved across the radial slider by dividing a determined movement distance by an amount of time. The control circuitry is operable to then compare the calculated rate to a threshold rate, and output the current radial position according to this comparison.

DESCRIPTION OF EXAMPLE EMBODIMENTS

Several preferable examples of the present application will now be described with reference to the accompanying drawings. Various other examples of the invention are also possible and practical. This application may be exemplified in many different forms and should not be construed as being limited to the examples set forth herein.

The figures listed above illustrate preferable examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class.

Only those parts of the various units are shown and described which are necessary to convey an understanding of the examples to those skilled in the art. Those parts and elements not shown may be conventional and known in the art.

Figure 2:
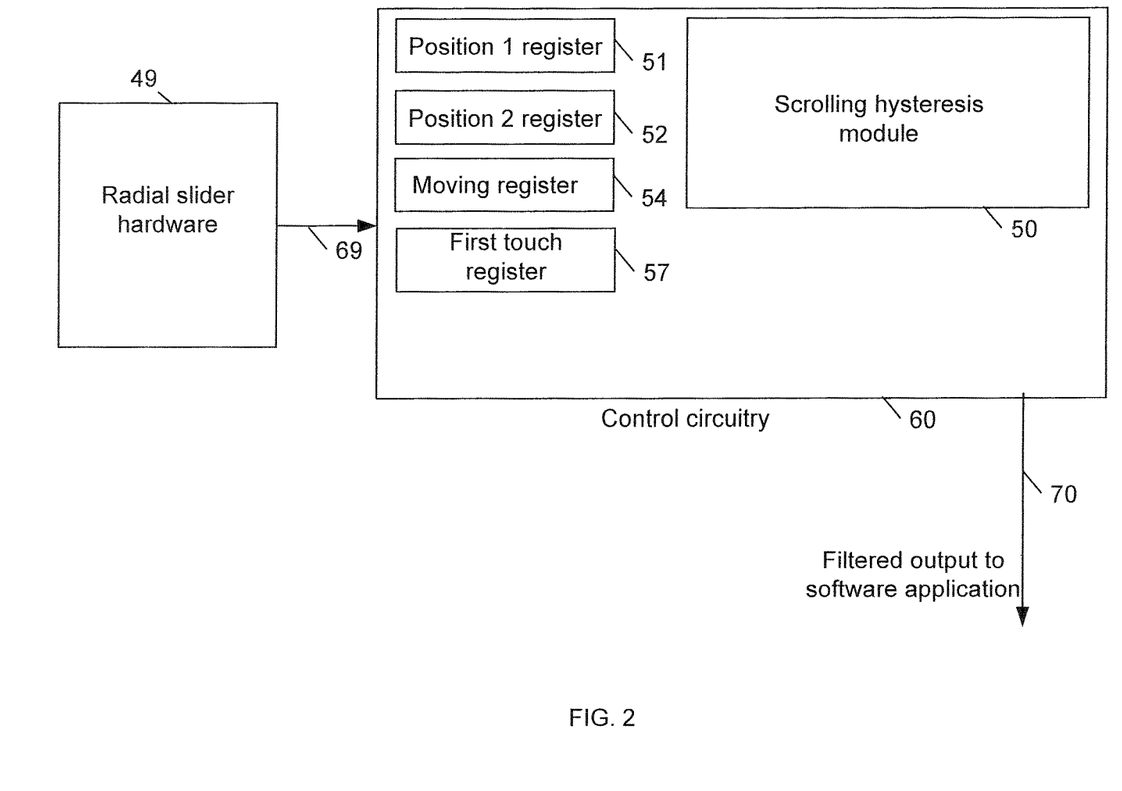
FIG. 2 illustrates example control circuitry that operates with capacitive touch hardware to mask certain detected touch positions.

FIG. 2 illustrates example control circuitry that operates with capacitive touch hardware to mask certain detected touch positions.

The control circuitry 60 communicates with radial slider hardware 49 or other capacitive touch hardware to filter touch indications 69 received from the hardware 49 before providing a filtered output 70 to a software application. In other words, certain ones of the touch indications 69 are filtered by the control circuitry 60 to generate the filtered output 70. A more detailed explanation of how the control circuitry 60 determines which touch indications to filter will be provided later in reference to FIG. 4. Also, configuration of the scrolling hysteresis module 50 and the registers 51, 52, 54 and 57 will be described in more detail with reference to FIG. 4.

By filtering certain touch indications, the control circuitry 60 reduces or eliminates invalid data reported to the software application. Accordingly, the radial slider hardware 49 is made interoperable with a great variety of programs and drivers. Moreover, since invalid data is more commonly output by physically smaller radial sliders, the filtering by the control circuitry 60 provides hardware designers new flexibility in reducing the physical size of radial slider hardware.

Figure 3A:
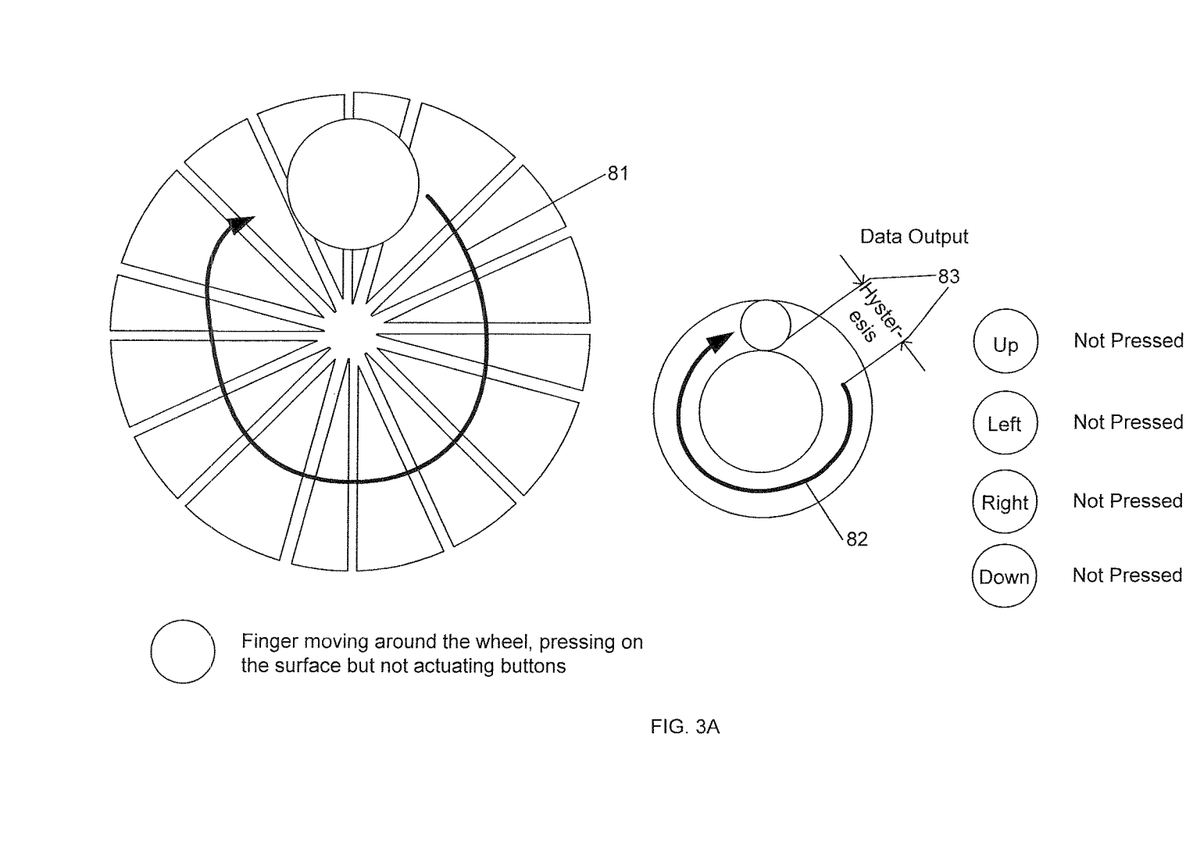
FIGS. 3A-B illustrate an example operation of the control circuitry shown in FIG. 2.
Figure 3B:
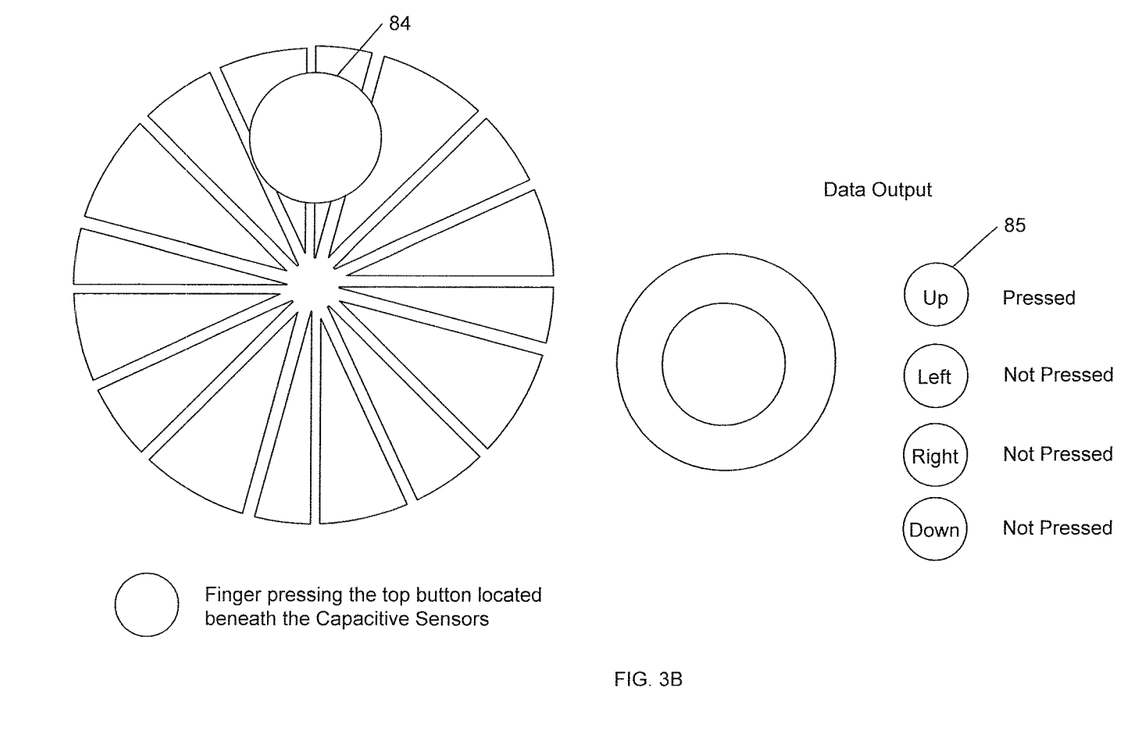

FIGS. 3A-B illustrate an example operation of the control circuitry shown in FIG. 2.

Referring to FIG. 3A, when a finger lightly touches the touch device moving along the path 81, the control circuitry 60 applies a hysteresis threshold 83 that prevents part of the movement from being reported. In other words, the output data includes the reported path 82, which masks a portion of the finger path 81.

Referring now to FIG. 3B, when the finger presses the touch device at location 84, the control circuitry 60 again applies the hysteresis threshold that prevents the touch location from being reported. In other words, the output data includes only the button press 85, and no light touch position, avoiding providing invalid data to the software application.

Figure 4:
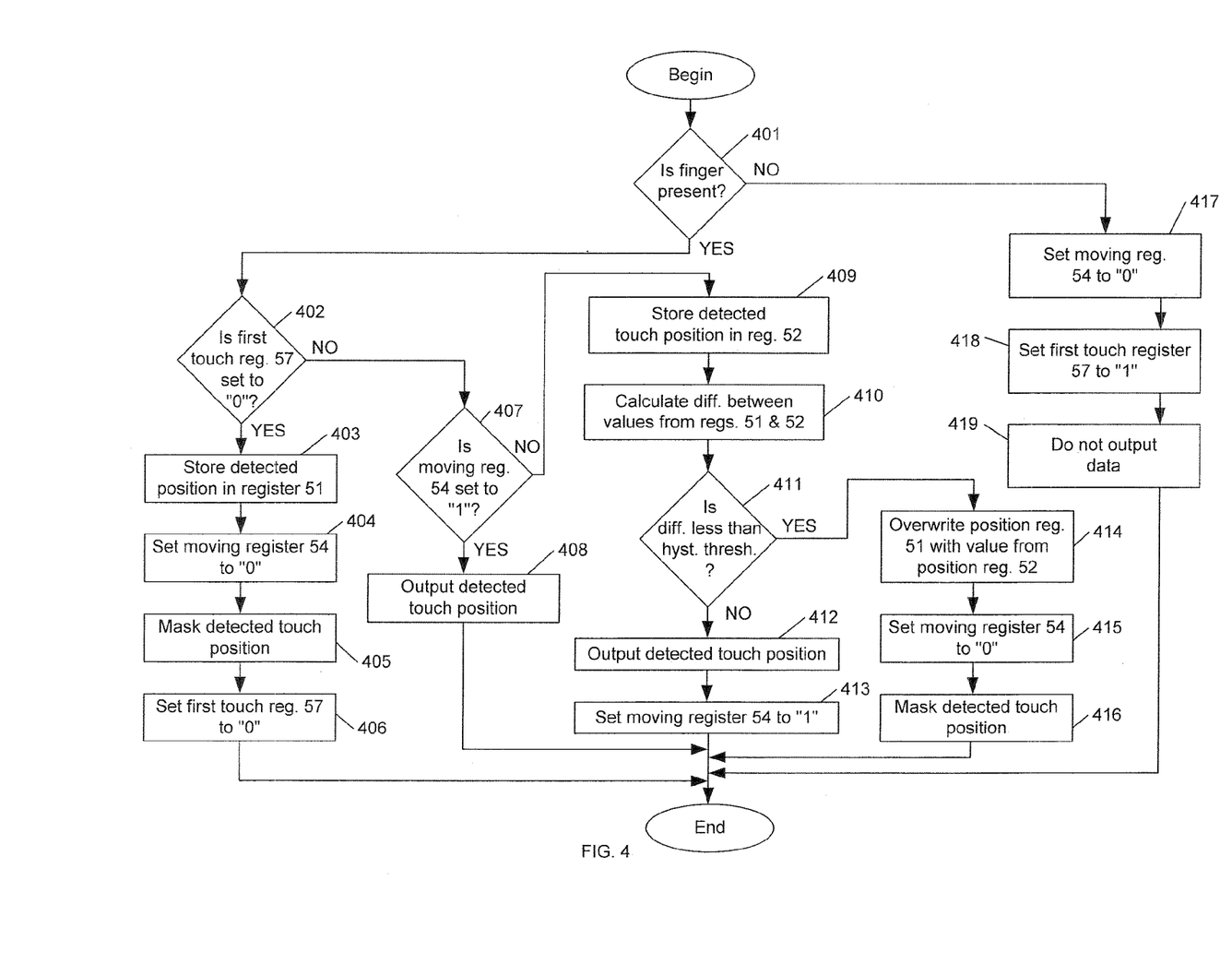
FIG. 4 is a flow chart illustrating general operation of the control circuitry shown in FIG. 2.

FIG. 4 is a flow chart illustrating operation of the control circuitry shown in FIG. 2.

Referring to both FIGS. 2 and 4, if the finger is present in decision box 401, then in decision box 402 the scrolling hysteresis module 50 determines whether the first touch register 57 is set to "0" or any other representation of "false". If the register 57 is set to "0", then in block 403 the module 50 stores the detected touch position in the register 51. The module 50 also sets the moving register 54 to "0" in block 404. The moving register 54 is a memory indicating whether there was a previous output position. The module 50 also masks or otherwise filters the detected touch position from the software application in block 405. The module 50 also sets the first touch register 57 to "0" in block 406.

If the first touch register 57 was not set to "0" in decision box 402, then in decision box 407 the module 50 determines whether the moving register 54 is set to "1" or any other representation of "true". If the moving register 50 is set to "1", then in block 408 the module 50 outputs the detected touch position to the software application.

If the moving register 54 was not set to "1" in decision box 407, then in block 409 the module 50 stores the detected touch position in register 52. In block 410, the module 50 calculates a difference between values from registers 51 and 52. In decision box 411, the calculated difference is compared to a hysteresis threshold, and if the calculated difference is not less than the hysteresis threshold, in block 412 the module 50 outputs the detected touch position in block 412. The programmable hysteresis value may be set at any amount, and for example, can be three degrees when a radial slider is mapped to three hundred and sixty positions. In block 413, the module 50 sets the moving register 54 to "1".

If the calculated difference is less than the hysteresis threshold in decision box 411, then in block 414 the module 50 overwrites position register 51 with the value stored in position register 52. In block 415, the module 50 sets the moving register 54 to "0". In block 416, the module 50 masks or otherwise filters the detected touch position from the software application.

If no finger is present on the touch device in decision box 401, then in block 417 the module 50 sets the moving register 54 to "0". In block 418, the module 50 sets the first touch register 57 to "1". No data is output to the software application in block 419.

Figure 5A:
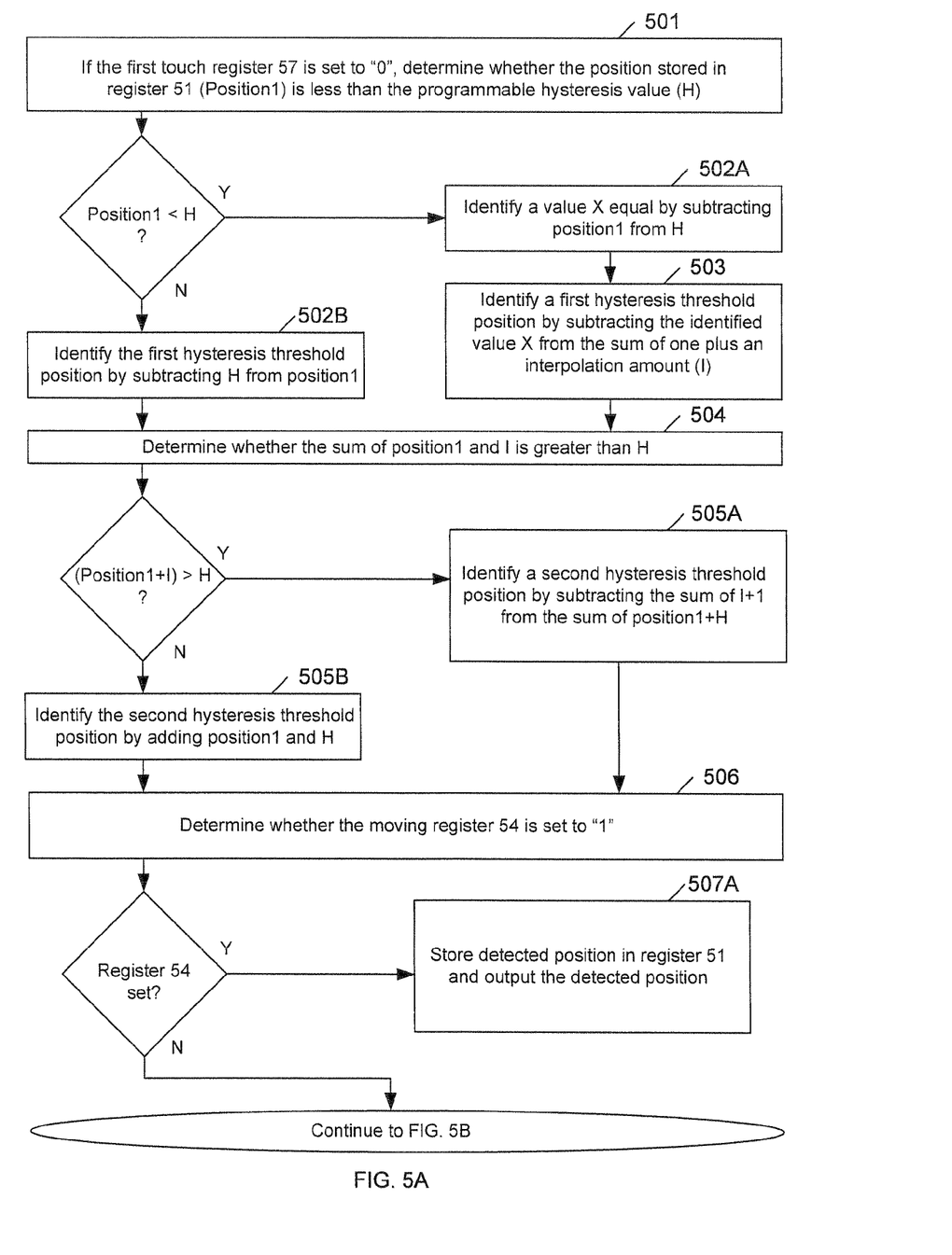
FIGS. 5A and 5B include a flow chart illustrating a process that can be used by the control circuitry shown in FIG. 2 to account for a wrap-around position on the radial slider.
Figure 5B:
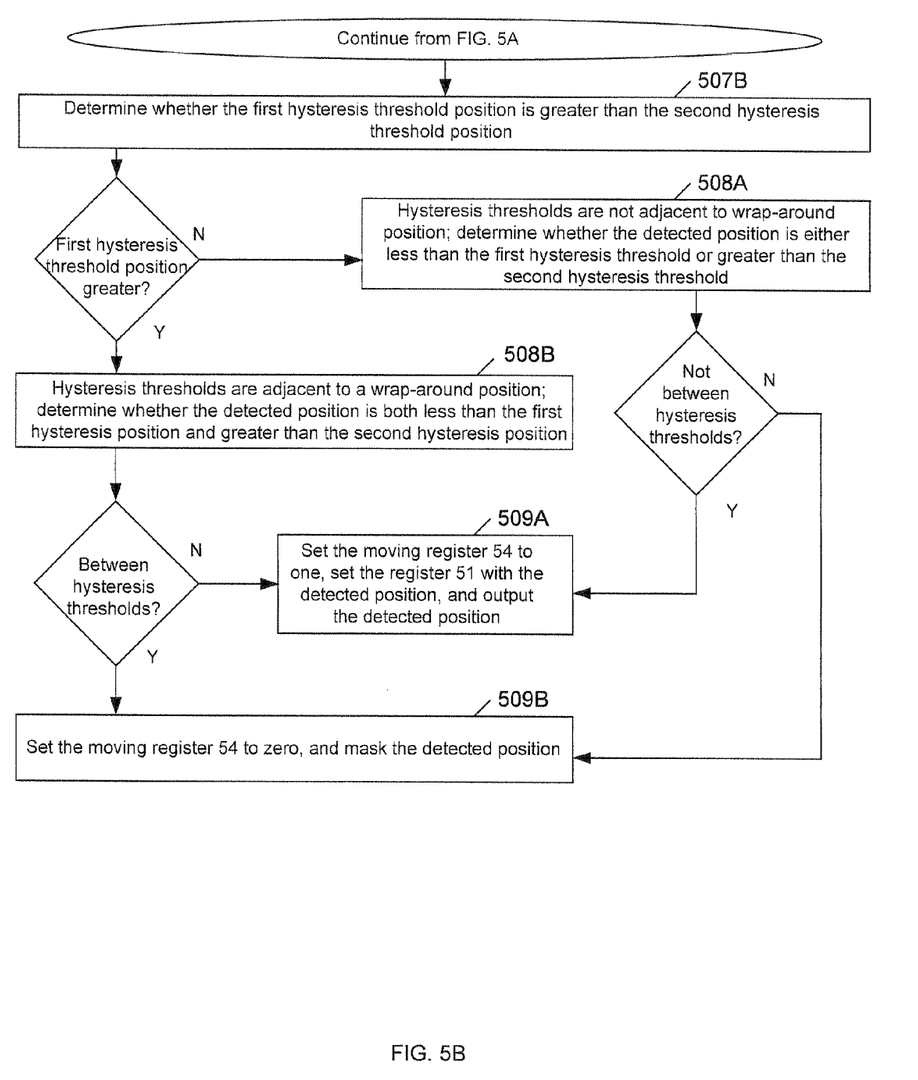

FIGS. 5A and 5B include a flow chart illustrating a process that can be used by the control circuitry shown in FIG. 2 to account for a wrap-around position on the radial slider.

After having described the general operation of the control circuitry 60 with reference to FIGS. 2 and 4, reference will now be made to FIGS. 2 and 5A-B to describe an additional process that can be performed to prevent the hysteresis threshold from being erroneously applied when finger touches are detected adjacent to a wrap-around point on the radial slider. On a typical radial slider, the wrap-around point occurs when finger touches are detected near the twelve o'clock position; therefore, the flowchart described herein is described with reference to this typical example. However, it should be apparent that the principals described below can be applied to other radial sliders configured with a wrap-around position mapped to any location on the radial slider.

If the first touch register 57 is set to "0", in block 501 the module 50 determines whether the position stored in register 51 (hereinafter referred to as "position1") is less than a programmable hysteresis value (hereinafter referred to as "H"). In the present example the detected position is a value between zero and three hundred and fifty nine, and thus it can be compared to a hysteresis value, such as three. If position1 is less than H, then in block 502A the module 50 identifies a value X by subtracting position1 from H. In block 503, the module 50 identifies a first hysteresis threshold position by subtracting the identified value X from the sum the interpolation amount (hereinafter referred to as "I") plus one. The interpolation amount is equal to the largest position, which in the present example is three hundred and fifty nine on the radial slider mapped to three hundred and sixty positions. It should be apparent that the sum of 1+I can also be expressed as the total number of positions on the radial slider, which is three hundred and sixty in the present example. If position1 is not less than H, then in block 502B the first hysteresis threshold is identified by subtracting H from position1.

In block 504, the module 50 determines whether the sum of position1 and I is greater than H. If the sum is greater than H, in block 505A the module 50 identifies the second hysteresis threshold position by subtracting the sum of I+1 from the sum of position1+H. Otherwise, if the sum is not greater than H, in block 505B the module 50 identifies the second hysteresis threshold position by adding position1 and H.

In block 506, the module 50 determines whether the moving register 54 is set to "1". If the register 54 is set to "1", in block 507A the module 50 stores the detected position in register 51 and outputs the detected position.

Continuing now with reference to FIG. 5B, if the register 54 is not set to "1", in block 507B the module 50 determines whether the first hysteresis threshold position is greater than the second hysteresis threshold position. If the first hysteresis threshold is greater, the hysteresis thresholds are not adjacent to the wrap-around position, and in block 508A the module 50 determines whether the detected position is either less than the first hysteresis threshold or greater than the second hysteresis threshold. For example, if the threshold positions are three and nine, then the detected position is not between these values if the detected position is within the range of zero to two or ten to three hundred and fifty nine. If either is true, the detected position is not between the hysteresis thresholds, and in block 509A the module 50 sets the moving register 54 to "1", sets the register 51 with the detected position, and outputs the detected position. If neither is true, the detected position is between the hysteresis thresholds, and in block 509B the module 50 sets the moving register 54 to "0" and masks the detected position.

If the first hysteresis threshold is greater than the second hysteresis threshold, the hysteresis thresholds are adjacent to a wrap-around position, and in block 508B the module 50 determines whether the detected position is both less than the first hysteresis position and greater than the second hysteresis position. If false, the detected position is between the hysteresis thresholds, but not within the hysteresis range due to the proximity of the hysteresis thresholds to the wrap-around position; therefore, the module 50 performs block 509A. If true, the detected position is not between the hysteresis thresholds, but still within the hysteresis range due to the proximity of the hysteresis thresholds to the wrap-around position, therefore, the module 50 performs block 509B.

Several preferable examples have been described above with reference to the accompanying drawings. Various other examples of the invention are also possible and practical. The system may be exemplified in many different forms and should not be construed as being limited to the examples set forth above. For example, it should be understood that the principles described with respect to the above example could be implemented using a single partitioned register, or no registers at all. Also, in the above example, the hysteresis threshold is based a difference between two positions. In other examples, the hysteresis threshold could also be based on a rate of movement, so that if a rate of movement of the finger does not exceed a movement rate threshold, the detected touch position of the finger is masked from the software application. The movement rate threshold can be applied in addition to the distance threshold, or instead of the distance threshold.

It should be apparent that the principals described can also be used to filter false touch indications on radial sliders that do not include strong press buttons, mechanical or otherwise. In such embodiments, the system can filter small movements or other unintended touch indications that do not exceed the hysteresis threshold.

The figures listed above illustrate preferable examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferable embodiment thereof, it should be apparent that the invention may be modified in arrangement and detail without departing from such principles. I claim all modifications and variation coming within the spirit and scope of the following claims.

The invention claimed is:
1. A system comprising:
a radial slider coupled to capacitive touch sense circuitry that is configured to output an indication of a position of an input object relative to a surface of the radial slider; and control circuitry comprising a first position register, a second position register and a scrolling hysteresis module, the scrolling hysteresis module to:

receive a first signal from the capacitive touch sense circuitry, the first signal indicating a previous radial position of the input object on the surface of the radial slider;

mask the previous radial position from an output of the control circuitry;

store the previous radial position in the first position register;

receive a second signal from the capacitive touch sense circuitry, the second signal indicating a current radial position of the input object on the surface of the radial slider;

store the current radial position in the second position register;

determine a difference between the current radial position stored in the second position register and the previous radial position stored in the first position register;

compare the determined difference to a hysteresis value, wherein the hysteresis value is a threshold representing a specified amount of angle for outputting or masking the current radial position;

mask the current radial position from the output of the control circuitry when the determined difference is less than the hysteresis value; and output the current radial position from the output of the control circuitry when the determined difference is not less than the hysteresis value.

2. The system of claim 1 further comprising a button located below the surface of the radial slider, the button configured to change positions if the input object is pressed against the surface of the radial slider using a force that exceeds a force threshold, and wherein the control circuitry is further operable to:

receive an indication that the input object pressed against the surface of the radial slider using a force that exceeds the force threshold; and output the press indication independently of whether the current radial position is masked.

3. The system of claim 1 wherein the hysteresis value is programmable.

4. An apparatus comprising control circuitry, wherein the control circuit comprising a first position register, a second position register and a scrolling hysteresis module, the control circuitry operable to:

receive a first indication of a previous radial position of an input object on a radial slider of a capacitive touch sense device;

store the previous radial position in a first position register;

mask the previous radial position from an output of the control circuitry;

receive a second indication of a current radial position of the input object on the radial slider of the capacitive touch sense device;

store the current radial position in a second position register; determine a difference between the current radial position stored in the first position register and the previous radial position stored in the second position register;

compare the determined difference to a threshold value, the threshold value representing a specified amount of angle for outputting or masking the current radial position; and mask an output the current radial position according to the comparison, when the determined difference is less than the threshold value; and output the current radial position when the determined difference is not less than the threshold value.

5. The apparatus of claim 4 wherein the control circuitry is further operable to:

output indications of input object presses without filtering; and filter indications of input object touches according to the comparison.

6. The apparatus of claim 4 wherein the control circuitry is further operable to:

identify a first threshold position and a second threshold position, the threshold positions corresponding to the previous radial position;

compare the threshold positions to determine if said positions are adjacent to a predefined wrap-around position on the radial slider; and if the threshold positions are not adjacent to the predefined wrap-around position, mask the current radial position if the current radial position is between the threshold positions.

7. The apparatus of claim 6 wherein the control circuitry is further operable to:

if the threshold positions are adjacent to the predefined wrap-around position, mask the current radial position if the current radial position is not between the threshold positions.

8. The apparatus of claim 6, wherein the control circuitry is further operable to:

determine whether the threshold positions are adjacent to a predefined wrap-around position on the radial slider according to whether the first threshold position is greater than the second threshold.

9. The apparatus of claim 4 wherein the threshold value is selected according to a user input.

10. The apparatus of claim 4 wherein the radial slider is mapped to three hundred and sixty positions.

11. The apparatus of claim 4 wherein the control circuitry is further operable to:

determine whether the previous radial position is less than the threshold value;

if the previous radial position is not less than the threshold value, determine a first threshold position by subtracting the threshold value from the previous radial position; and if the previous radial position is less than the threshold value, determine the first threshold position by first subtracting the previous radial position from the threshold value, and then subtracting the difference from the number of radial positions mapped to the radial slider.

12. The apparatus of claim 11 wherein the control circuitry is further operable to:

determine whether the sum of the previous radial position and the number of radial positions mapped to the radial slider is greater than the threshold value;

if the sum is not greater than the threshold value, determine the second threshold position by adding the threshold value to the previous radial position; and if the sum is greater than the threshold value, determine the second threshold position by subtracting the number of radial positions from the sum of the previous radial position and the threshold value.

13. The apparatus of claim 4, wherein the control circuitry is further operable to:

calculate a rate that the input object has moved across the radial slider by dividing the determined distance by an amount of time;

compare the calculated rate to a threshold rate; and output the current radial position according to both of the comparisons.

14. A method comprising:

detecting a first radial position of an input object on a radial slider of a capacitive touch sense device;

storing the first radial position;

masking, by a control circuitry, wherein the control circuit comprising a first radial position register, a second radial position register and a scrolling hysteresis module, the first radial position from being output from the control circuitry;

detecting a second radial position of the input object on the radial slider of the capacitive touch sense device;

determining a difference between the detected second radial position and the previously detected first radial position;

comparing the determined difference to a hysteresis value, the hysteresis value representing a specified amount of angle for outputting or masking the detected second radial position; and filtering the detected second radial position based at least in part on the determined difference being less than the hysteresis value.

15. The method of claim 14 further comprising:

receiving an indication that the input object pressed against the radial slider using an amount of force exceeding a force threshold; and outputting the press indication independently of whether the detected radial position is filtered.

16. The method of claim 14 further comprising:

determining whether the previously detected radial position is less than a threshold value;

if the previously detected radial position is not less than the threshold value, determining a first threshold position by subtracting the threshold value from the previously determining radial position; and if the previously detected radial position is less than the threshold value, determining the first threshold position by subtracting the previously detected radial position from the threshold value, and then subtracting the difference from the number of radial positions mapped to the radial slider.

17. The method of claim 16 wherein the control circuitry is further operable to:

determining whether the sum of the previously detected radial position and the number of radial positions mapped to the radial slider is greater than the threshold value;

if the sum is not greater than the threshold value, determining the second threshold position by adding the threshold value to the previously detected radial position; and if the sum is greater than the threshold value, determining the second threshold position by subtracting the number of radial positions from the sum of the previously detected radial position and the threshold value.

18. The method of claim 17 further comprising:

comparing the threshold positions to determine if said positions are adjacent to a predefined wrap-around position on the radial slider;

if the threshold positions are not adjacent to the predefined wrap-around position, masking the current radial position if the current radial position is between the threshold positions.

19. The method of claim 18 further comprising:

if the threshold positions are adjacent to the predefined wrap-around position, masking the current radial position if the current radial position is not between the threshold positions.

20. The method of claim 14 wherein the detected radial position is filtered according to a movement rate threshold.

* * * * *